US005200765A

United States Patent [19]
Tai

[11] Patent Number: 5,200,765
[45] Date of Patent: Apr. 6, 1993

[54] APPARATUS AND METHOD FOR CALIBRATING A GREY LEVEL PRINTHEAD

[75] Inventor: Hwai-Tzuu Tai, Rochester, N.Y.

[73] Assignee: Eastman Kodak Company, Rochester, N.Y.

[21] Appl. No.: 498,512

[22] Filed: Mar. 26, 1990

[51] Int. Cl.$^5$ .................... G01D 9/00; G01D 9/42
[52] U.S. Cl. .................... 346/107 R; 346/1.1
[58] Field of Search ........... 346/107 R, 1.1, 154, 346/160, 76 PH; 364/519; 359/108, 109, 115

[56] References Cited

U.S. PATENT DOCUMENTS

| | | |
|---|---|---|
| 3,850,517 | 11/1974 | Stephany et al. |
| 4,588,883 | 5/1986 | Abbas . |
| 4,746,941 | 5/1988 | Pham et al. ............... 364/519 |
| 4,757,327 | 7/1988 | Henzi ............... 346/1.1 |
| 4,780,731 | 10/1988 | Creutzmann et al. ....... 346/108 |
| 4,799,071 | 1/1989 | Zeise et al. ............... 346/160 |
| 4,827,279 | 5/1989 | Lubinsky et al. ............ 346/1.1 |
| 4,831,395 | 5/1989 | Pham et al. ............... 346/160 |
| 4,885,597 | 12/1989 | Tschang et al. ............ 364/519 |
| 4,897,672 | 1/1990 | Horiuchi et al. ............ 346/107 R |
| 5,016,027 | 5/1991 | Uebbing ............... 346/107 R |

OTHER PUBLICATIONS

U.S. application Ser. No. 07/290,002, filed Dec. 27, 1988, Pham et al.

U.S. application Ser. No. 07/375,159, filed Jul. 3, 1989, Yee S. Ng.

Primary Examiner—Benjamin R. Fuller
Assistant Examiner—David Yockey
Attorney, Agent, or Firm—Norman Rushefsky

[57] ABSTRACT

A method and apparatus for calibrating a grey level LED printhead or the like to control uniformity of light emissions with a desired criterion such as 2% recording error. A set of possible exposure times is established and from this set a subset of exposure times is assigned to each LED for use in recording the various grey levels. An error is calculated for each LED at each grey level. These errors result from use of available times rather than ideal exposure times. The errors are examined to see if they meet the desired criterion. If the criterion is not met, a new set of possible exposure times is established and the subsequent steps repeated until the criterion is met. In another embodiment, the subset of exposure times for each recording element is determined by dividing the sum of its exposure set point for a particular grey level and the error calculated for an adjacent recording element by the measured intensity of the recording element and comparing this quotient with the set of possible exposure times. This minimizes the errors in exposure resulting from exposures created by overlapping radiation from adjacent LED's.

22 Claims, 12 Drawing Sheets

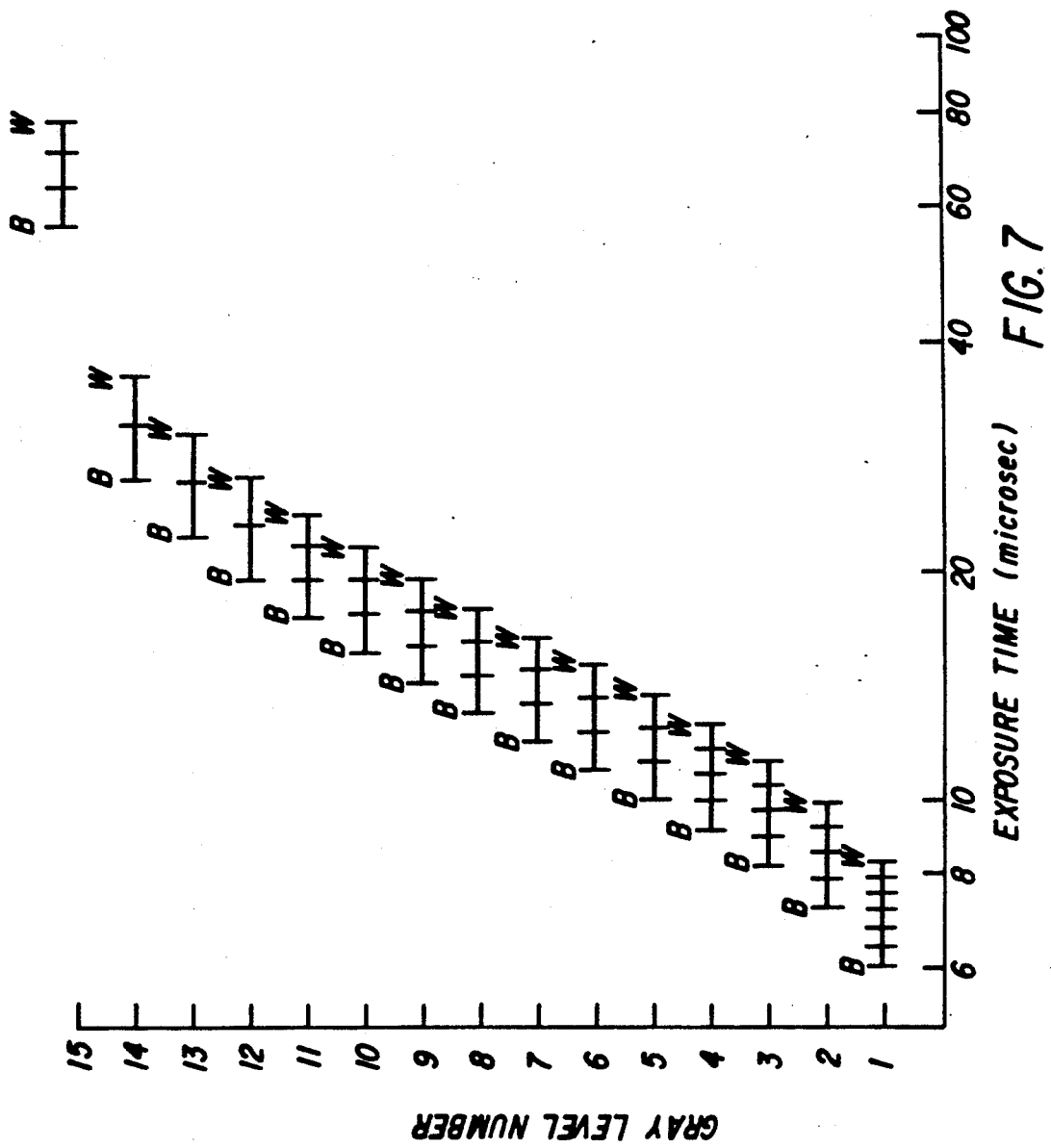

APPARATUS AND METHOD FOR CALIBRATING A GREY LEVEL PRINTHEAD

BACKGROUND OF THE INVENTION

1. Field of the Invention

The present invention relates to a method and apparatus for calibrating a non-impact printer for printing information with small pixels (dots).

2. Description of the Prior Art

Various non-impact recording or printer heads for use as dot printers are known. Examples of such heads include an electrostatic printer head, an LED (light emitting diode) array printer head, ink-jet printer head, thermal printer head, etc. While the invention will find utility with regard to non-impact printers in general, discussion will be made herein with regard to LED printer heads with which the invention is particularly suited.

In U.S. patent application Ser. No. 07/290,002, filed in the names of Pham et al, an LED printer is described in which a series of LED's arranged in a straight line are selectively activatable for brief periods to form dot-like images on a recording surface. In the printer described in this application, grey scale recording is achieved by pulsewidth modulation of the exposure times. To accomplish this, a digital comparator is associated with each LED. At one input to the comparator, there is provided the data in the form of a plurality of digital data bits representing an exposure on-time for that LED for that PEL period. At a second input to the comparator, an input from an up/down counter is provided that is rapidly changing in accordance with signals emitted from a high speed clock. As the counter output value decreases towards zero at some point in time a match is sensed by the comparator between the two inputs of the comparator (in accordance with its operating criterion). The LED then turns on and remains on for a very brief duration until a subsequent sensing of a match by the comparator occurs during a count-up phase of the counter. The above application notes that the data may be adjusted to provide also for exposure balancing of the LED's. This is desirable where non-uniformity in illumination from LED to LED on the printer head may be expected. The application notes that a programmable clock may be employed to adjust the time period for each clock pulse.

A problem addressed in the above application is that of efficiently covering as much exposure space as might be desirable for grey level recording. Assuming one employs six data bits to define each pixel, 63 levels of grey may be recorded (not including white, i.e., no activation.) However, these 63 levels must be recordable within a time period comprised of at most 126 uniform clock periods plus a minimum established time, $T_{MIN}$. Where the clock periods are of relatively short duration, the 63 levels of grey may not provide the desirable range of grey levels. On the other hand, where the clock periods are of relatively longer duration, adequate extremes of grey may be recorded but fine differences in grey level recording particularly desired at relatively lower grey values will be lost.

The printer described in the above application overcomes this problem by employing a non-linear clock. Thus, clock pulses are generated at nonuniform times to provide an expanded exposure time range without increasing the amount of data bits used to determine exposure time for each LED.

It is an object of the invention to provide an apparatus and method for automatically determining the non-linear clock periods for use in such a printer apparatus.

SUMMARY OF THE INVENTION

The above and other objects which will become apparent from the reading hereof are accomplished by a method and apparatus for calibrating a printhead having a plurality of light-emitting recording elements; the calibration in accordance with one aspect of the invention comprising the steps of:

(a) measuring the light intensity of each recording element;

(b) generating a set of possible exposure times for which recording elements may be energized;

(c) assigning each recording element a subset of exposure times from each set of possible exposure times, said subset having a number of members equal to the number of grey levels to be recorded by that recording element but having a number of members less than in said set;

(d) for each recording element, calculating the exposure errors resulting from assigning that recording element the subset of exposure times from said set;

(e) comparing the exposure errors with a criterion establishing acceptable error;

(f) if the criterion is not met, repeating steps (b)-(e) with assigning of a new set of possible exposure times in step (b) until the criterion is met;

(g) when the criterion is met, storing the subset of exposure times in memory so that in response to a signal calling for reading of a grey level pixel, the signal is transformed into a second signal related to one of the stored exposure times in said subset.

In accordance with another embodiment of the invention, a method and apparatus for calibrating a printhead having a plurality of light-emitting recording elements is provided; the calibration comprising the steps of:

(a) measuring the light intensity of each recording element being calibrated;

(b) assigning one recording element a subset of exposure times from a set of available exposure times, said subset having a number of members equal to the number of grey levels to be recorded by that recording element;

(c) calculating exposure errors resulting from assigning said one recording element the subset of exposure times from said set; and (d) determining a subset of exposure times for an adjacent recording element from said set of available exposure times by using the errors calculated in step (c) as a factor in the determination; and (e) storing signals related to the determined subset of exposure times in memory.

DESCRIPTION OF THE DRAWINGS

FIGS. 4-9 illustrate various graphs that may be used to determine the various allowed on-times for the recording elements.

DESCRIPTION OF THE PREFERRED EMBODIMENTS

Because apparatus of the type described herein are well known, the present description will be directed in particular to elements forming part of, or cooperating more directly with, the present invention.

Figure 1:
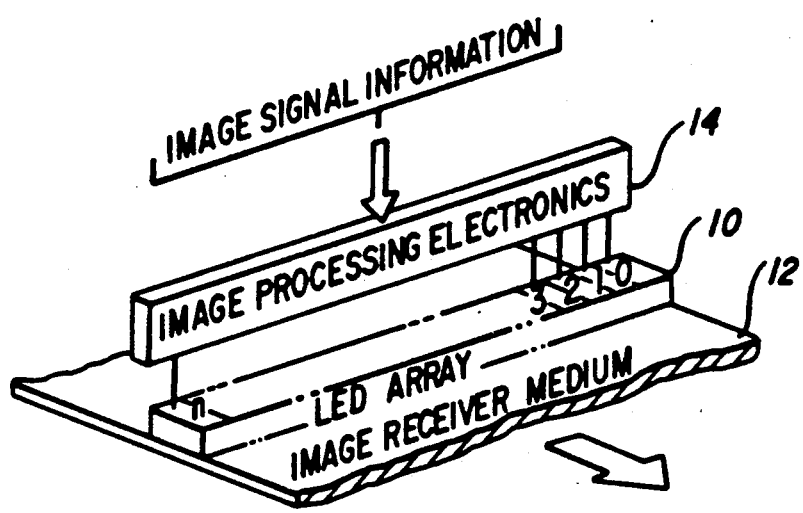
FIG. 1 is a perspective view illustrating the general arrangement of a non-impact printer as used in the embodiment of the invention and as known in the prior art.

The apparatus for the herein disclosed invention is typified by the diagram of FIG. 1: a linear array 10 of say 3584 triggerable radiation sources; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using colored toner particles and perhaps transferred to a copy sheet, see U.S. Pat. No. 3,850,517, the contents of which are incorporated herein.

Figure 2:
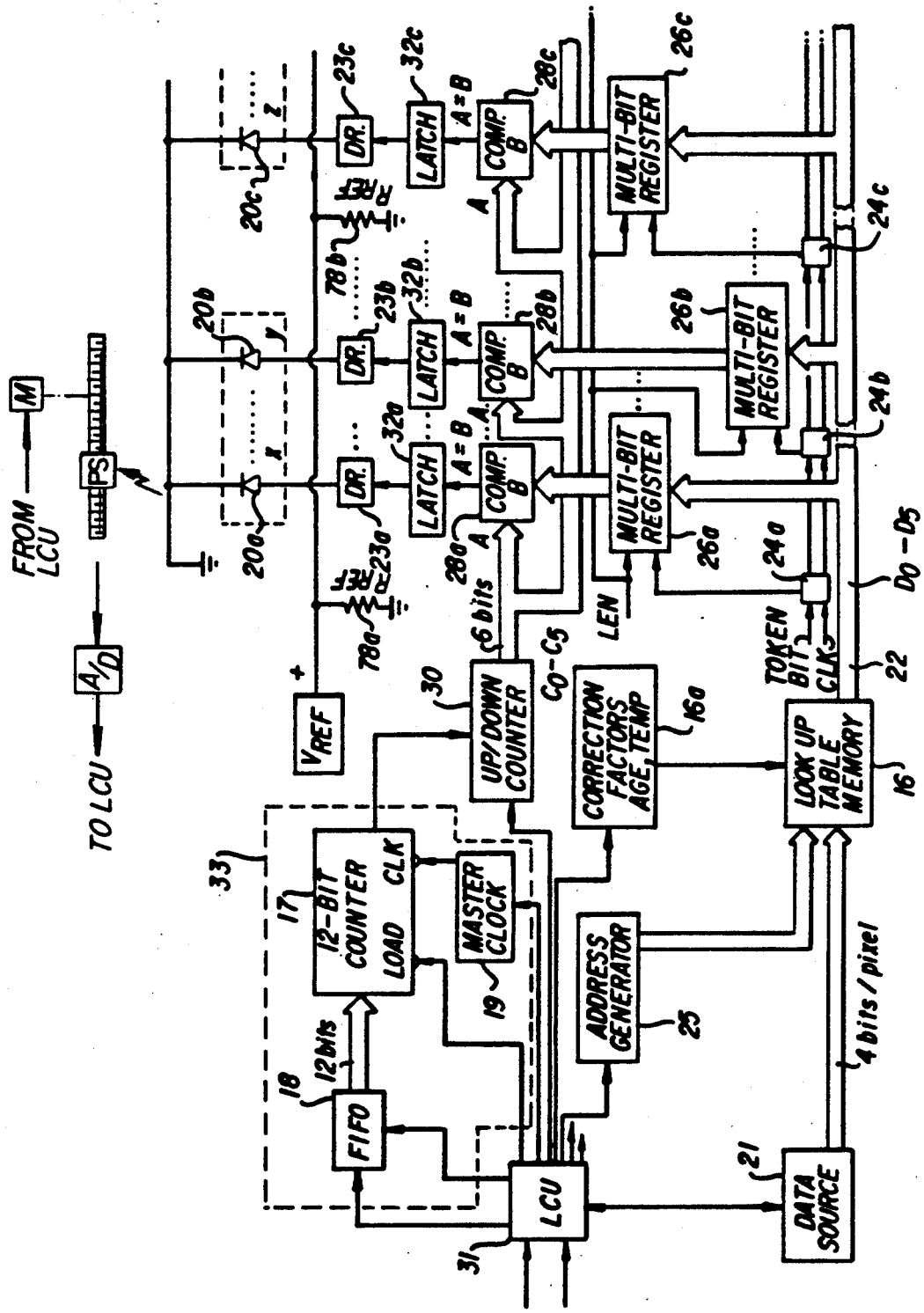
FIG. 2 is a schematic of a printer circuit for recording grey scale information in a printer calibrated in accordance with the method and apparatus of the invention.

With reference now to FIG. 2, a circuit is shown which may be used for triggering selectively the LED's 20 that together comprise the array 10. Only a few of the LED's and its associated driver circuitry are shown for clarity purposes, it being understood that the circuitry for driving such other LED's is similar to that described for the illustrated examples. While the figure shows all the driver circuitry associated with the LED's located to one side of the line of LED's, it is well known to place these circuits on both sides of the line of LED's to provide more efficient utilization of space. In this regard, integrated circuit driver chips for driving odd-numbered LED's are located on one side of the line of LED's and identical driver chios for driving even-numbered LED's are located on the opposite side.

Data to be printed for each line is in the form of binary digital signals, e.g., 1's and 0's. This data on lines labeled $D_0$–$D_5$ are outputted in parallel onto the data bus 22. The data on lines $D_0$–$D_5$ comprises, in this example, a six-bit signal representing an exposure time for a particular LED for printing a single grey level recorded dot. Synchronously with the generation of each six-bit data signal, there is generated by, for example, a logic and control unit (LCU) 31 a token bit signal which is a single bit that is shifted down a shift register formed by a plurality of individual registers 24a, 24b, 24c, etc. Each such register is associated with a particular LED. This token bit determines which of the LED's a particular set of data on bus 22 is intended. In operation, a series of six-bit data signals are provided on bus 22 and one six-bit signal is latched by each of the 3584 multibit registers 26a, 26b, 26c associated with each LED. The latching being in response to the presence of the token bit in the particular register 24a or 24b or 24c, etc. Further description relative to a circuit for selectively latching this data is provided in U.S. Pat. No. 4,746,941, entitled "Dot Printer With Token Bit Selection of Data Latching," the contents of which are incorporated herein by this reference. After a six-bit data signal is stored in each of the multi-bit registers, a latch enable (LEN) signal is provided by the LCU 31 to shift this six-bit signal to an output stage or latch of each register so that a six-bit level data signal (say decimal 10 for LED 20a for this particular PEL period) is output to one input terminal (B) of a respective digital comparator 28a, 28b, 28c, etc. associated with each LED. At this point in time a digital counter 30 is enabled by LCU 31 to count down, in this example, from decimal 63 ($2^6$-4 1) to 0. The output of the counter 30 is a six-bit signal, in this example, ($C_0$–$C_5$) representing in digital form a number or count which changes periodically in accordance with clock pulses from a programmable clock 33. With each pulse (or trailing edge of same) from clock 33, the counter changes its count at its output. The output of counter 30 is input into each of the input terminals (A) of the digital comparator. Thus, the comparators now compare the signals at their respective A and B inputs in accordance with the comparators criteria for operation, i.e., is A equal B? When the count output by the counter 30 and inputted at terminal A is equal to a respective input data signal count input at terminal B (decimal 10, for example, but can be any number between 1 and 63) the output of a respective comparator goes to a digital logic high level and is latched at a respective latch register 32a, 32b, 32c, etc. The latched signals allow drivers 23a, 23b, 23c to be enabled, at the rising edge of the next clock pulse from programmable or variable clock 33, to commence and maintain current respectively to LEDs 20a, 20b, or 20c, etc. After the counter 30 counts down to zero, the counter 30 is either reset by the next clock pulse into a count-up mode or is inhibited from counting additional clock pulses for a minimum period $T_{MIN}$ that is programmed into the counter or provided by other suitable means. In the example shown in FIG. 3, the duration of $T_{MIN}$ is from a count of "1" in the down counting mode to a count of "1" in the up counting mode and the manner for controlling the time for reaching these counts will further be described below. In any event, after this predetermined time period $T_{MIN}$, the counter is set to count in its count-up mode and commences counting clock pulses again. When the counter output in its count-up mode reaches decimal 10, the output of comparator 28a changes and the latch 32a is reset and current to the LED 20a ceases. The other LED's 20b, 20c, etc. operate in similar fashion but their data will require different count values to turn on and off in accordance with grey scale data provided in their respective multibit registers. What these LED's will, thus, have in common with LED 20a is that all will have their respective current pulses centered. The current level to each LED driven by a particular driver chip is the same but the pulse duration for each LED during each line of print is varied. In this embodiment the LED's may be initially "balanced" such as by adjusting a "trim" resistor 78a, 78b, associated with current mirrors for each driver chip, see for example U.S. Pat. No. 4,831,395. Other known techniques for balancing output of the recording elements may also be provided. See, for example, U.S. Pat. No. 4,885,597 in the names of Pin Tschang et al. In addition, further balancing or correction for unequal light output may be provided by adjustment of the data in accordance with the characteristics of each LED. Thus, a memory device such as a programmable read-only memory device or PROM may store the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data.

Further description relative to this additional type of balancing of recording elements will be provided below.

Figure 4:
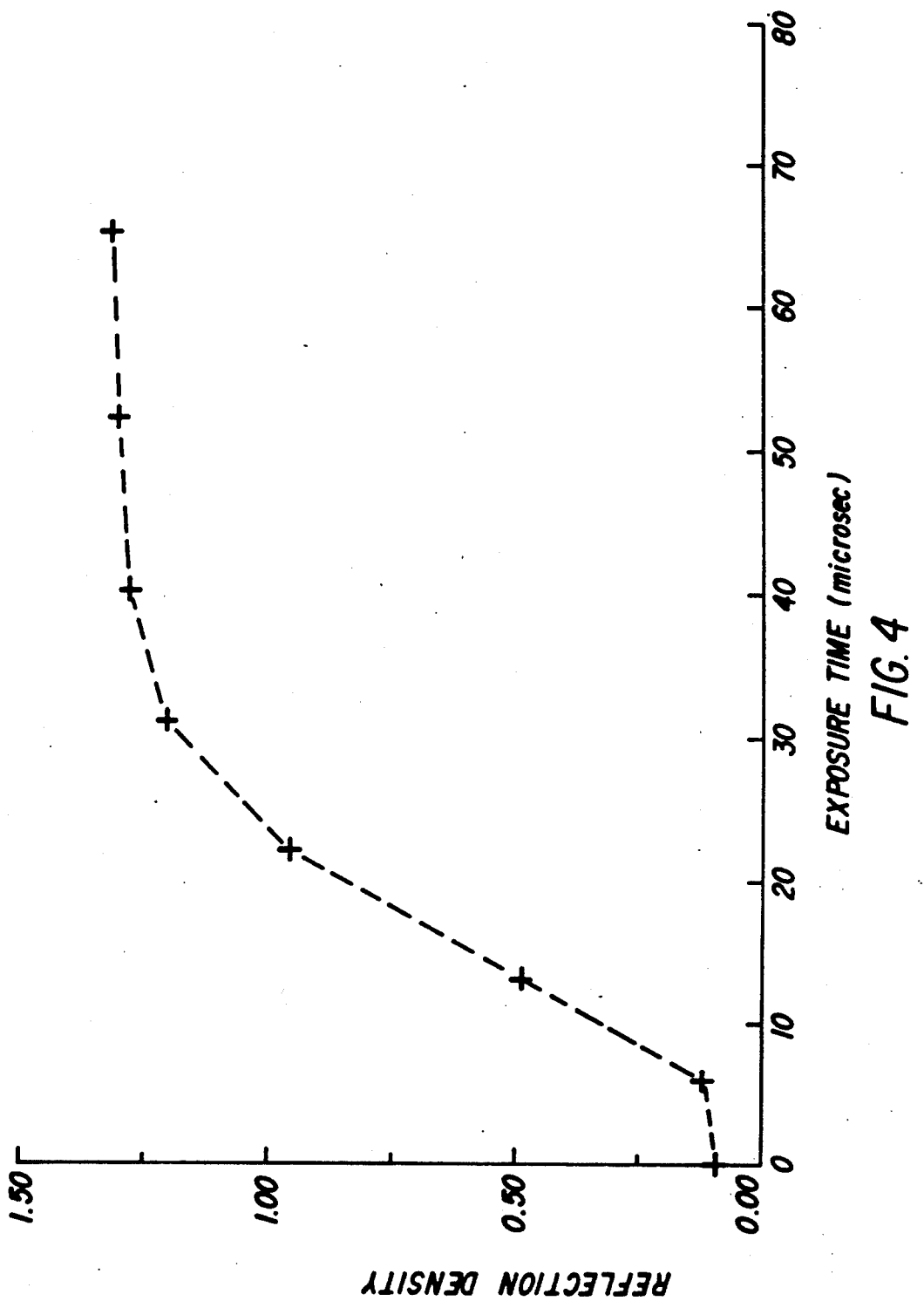

With reference to FIG. 4, there is illustrated a typical diagram illustrating recorded reflection density versus exposure time for a recording using a single average LED in the array. The recorded reflection density will vary obviously in accordance with the exposure time of this LED. As may be noted the eventual reflection density approaches a maximum value and that further exposure durations produce some, but not great, changes in recorded reflection density.

Figure 5:
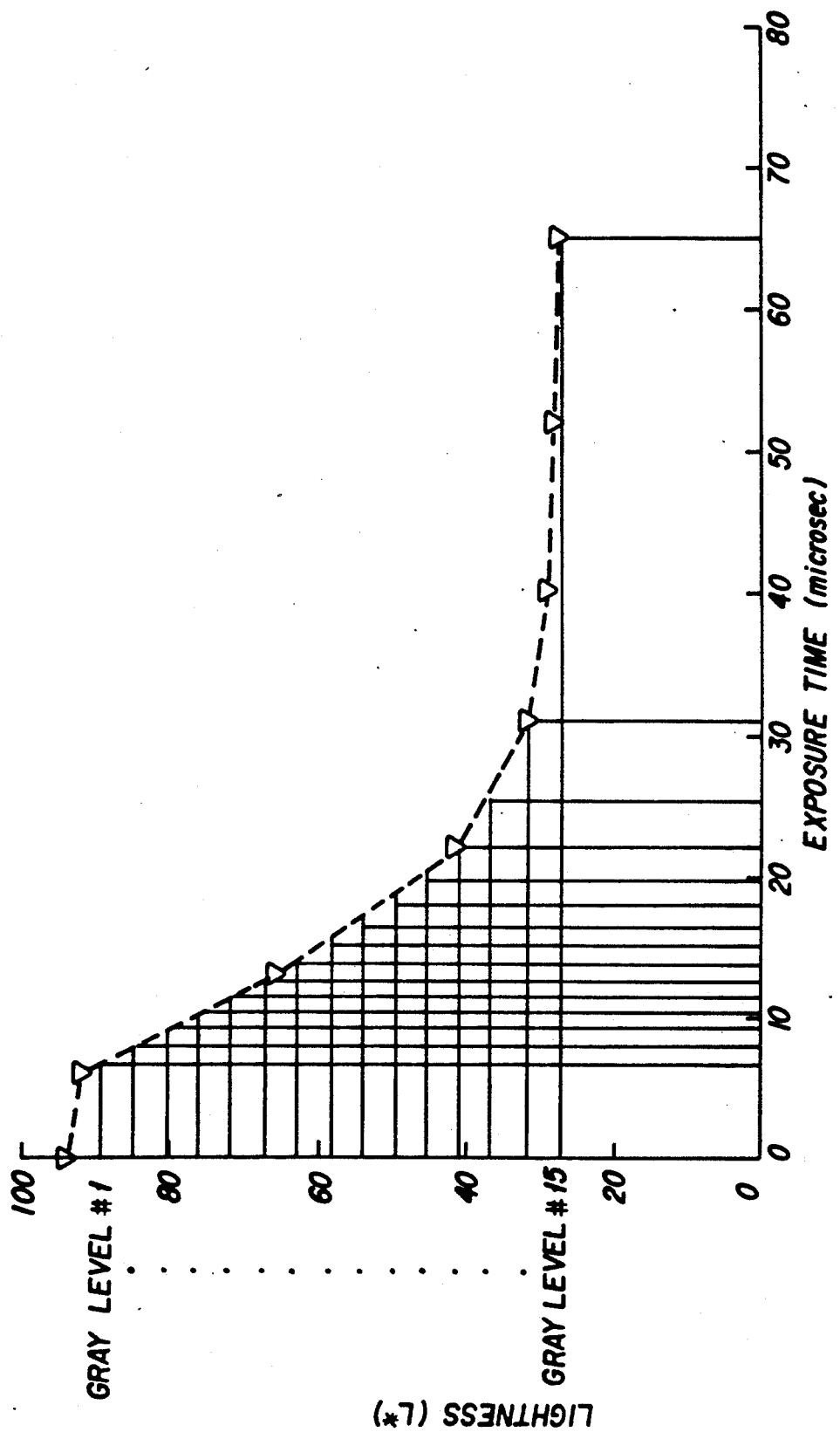

FIG. 5 illustrates the data of FIG. 4 transformed into lightness space. As known to those skilled in the art, such a transformation may be readily made by taking a value of reflection density (D) and forming the variable "lightness" (L*) therefrom in accordance with any of several known equations. Like transformations, including those for use in color printing and providing transformations into color space are also well known. Thus, lightness may now be plotted versus time and provides a relationship between various exposure times. It should be kept in mind that the light output of this LED is preferably balanced to at least some degree using adjustments to say $R_{REF}$, the driver resistance value as described above. The advantage of employing the relationship between lightness and time is that, as is known, one can divide lightness space into equal increments and employ the corresponding exposure times to obtain a series of exposure areas with levels of grey that to the human eye appear to represent equal percentage changes in lightness. Thus, as shown in FIG. 5, lightness space is divided into 15 equally spaced grey levels (1-15) where obviously the higher the lightness value, the lower the grey value. The division into 15 levels is selected since in this embodiment output by the data source 21 provides 4 bits per pixel of rasterized data or grey level information or decimal 15 ($2^4-1$) levels of grey and one level being no or "0" exposure. Thus, the 15 levels are chosen by selecting the lowest and highest desired levels of lightness and dividing the space in between to provide 15 levels of lightness or grey values. For each grey value a corresponding exposure time is associated therewith for each LED.

Figure 6:
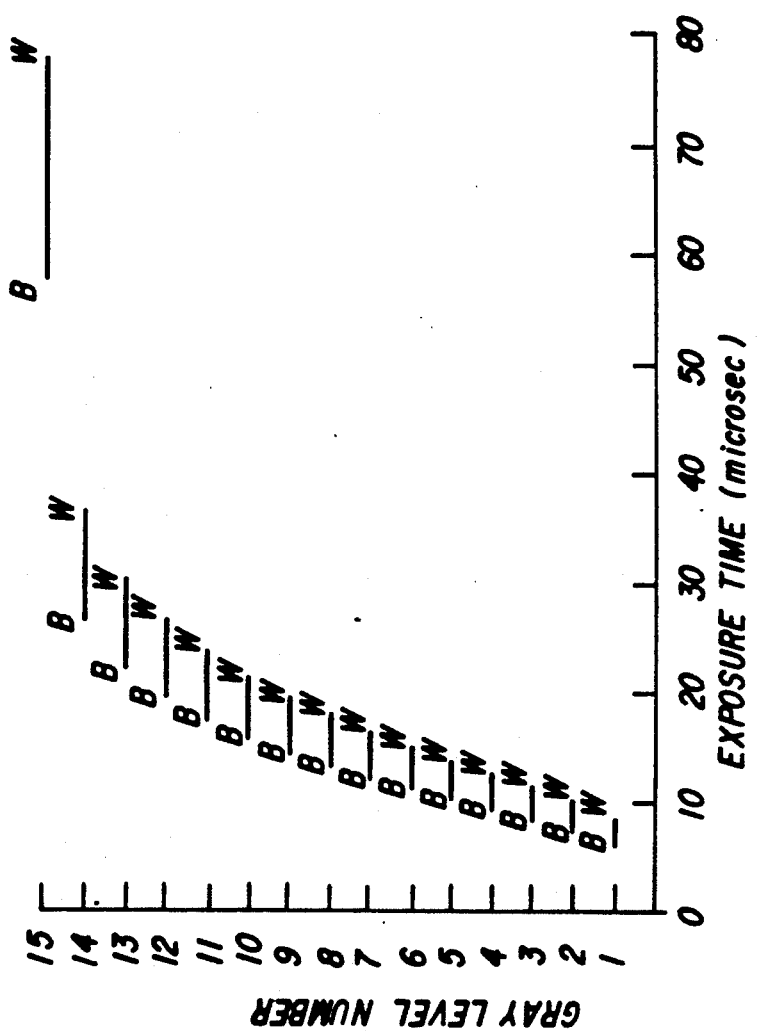

Description will now be had with reference to the graph in FIG. 6. In the description provided with regard to FIG. 5, it was noted that this was typical data for an average LED. Recall that the LEDs have been somewhat balanced by use of selective adjustment of $R_{REF}$ associated with say 64 LEDs driven by the respective driver chip. However, there will still be a small percentage of differences in light outputs between the LEDs; i.e., for the same signal some LEDs will provide more light and others less light because of their inherent differences or due to differences in their drivers or variations in LED fabrication process. FIG. 6 represents an illustration of this. Each horizontal hash-like line represents a range of exposure times that are needed for all the LEDs in the array to provide an exposure of the indicated grey level. Taking grey level No. 1, for example, the very brightest LED in the arrays will require the least amount of exposure time to record a density equivalent to grey level No. 1. This exposure will be for the period $T_{MIN}$ shown in FIG. 3. The minimum exposure time for each grey level is indicated by the letter B (for brightest LED's) which is located at the left most extreme of each line. On the other hand, the very weakest LED's in the array will require the longest exposure time (indicated by a W at the end of the line) to produce a dot having a density equal to grey level No. 1. Obviously, the remaining LED's in an array will require exposure "on" times between points B and W. The range of exposure times for each LED may then be determined for each grey level as shown.

It may also be noted in FIG. 6 that for any LED the exposure time difference for producing a dot of grey level No. 2 versus that for producing a dot to form grey level No. 1 is a very small difference in time. In this regard, compare the difference in exposure times for the brightest LED's (B) at grey level No. 1 and at grey level No. 2 with that difference in exposure times for the brightest LED's between grey levels Nos. 14 and 15. While the time between "B" of grey level 15 and "W" of grey level 14 is shown exaggerated to demonstrate the flexibility of the improved printing apparatus, it is generally true that the eye is more sensitive to changes at the lower levels of density than for changes at the upper levels of density. Similarly, if one desired to precisely balance the outputs of all the LED's on an array an algorithm for achieving this balance can preferably take advantage of this fact. However, for one designing a printhead using digital devices a constraint is provided as to how much correction information can be provided realizing that data has to be carried over lines formed on the printhead and only so many lines can be economically provided on a printhead. In addition, the more lines of data require more complexity in the logic devices for handling this data on the printhead.

With this in mind, reference will now be made to FIG. 7 wherein the exposure times associated with each grey level are shown divided up by vertical lines which will now be explained. Recognizing that a printhead has 3584 LEDs the range of exposure times for producing a dot of grey level No. 1 will fall on the horizontal line shown. If this line is divided into say seven distinct values, all exposures times on this horizontal line can be approximated by one of the times represented by the seven vertical lines crossing this horizontal time line. Similarly, this can be repeated for each grey level but note that higher grey levels need not have as many approximating points as the eye may not be able to detect finer approximations. Recognizing this will result in more efficient use of available data lines.

Figure 8:
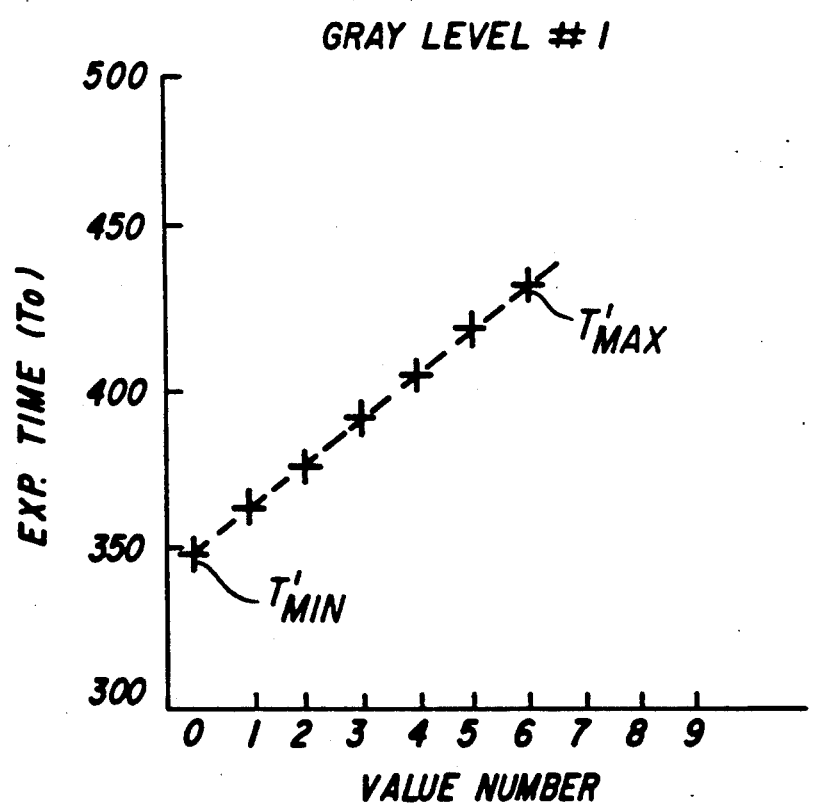

With reference now also to the graph of FIG. 8, the seven approximated exposure times for grey level No. 1 are assigned a value "0" through "6" and are plotted against exposure time in terms of number of master clock periods. Time in the printer apparatus of FIG. 2 is measured in terms of clock periods from master clock 19, with master clock 19 being a clock providing regular pulses at a frequency of say 40 MHz. Thus, for producing grey level No. 1 the brightest LEDs will be "on" for say 350 pulses from master clock 19.

Figure 9:
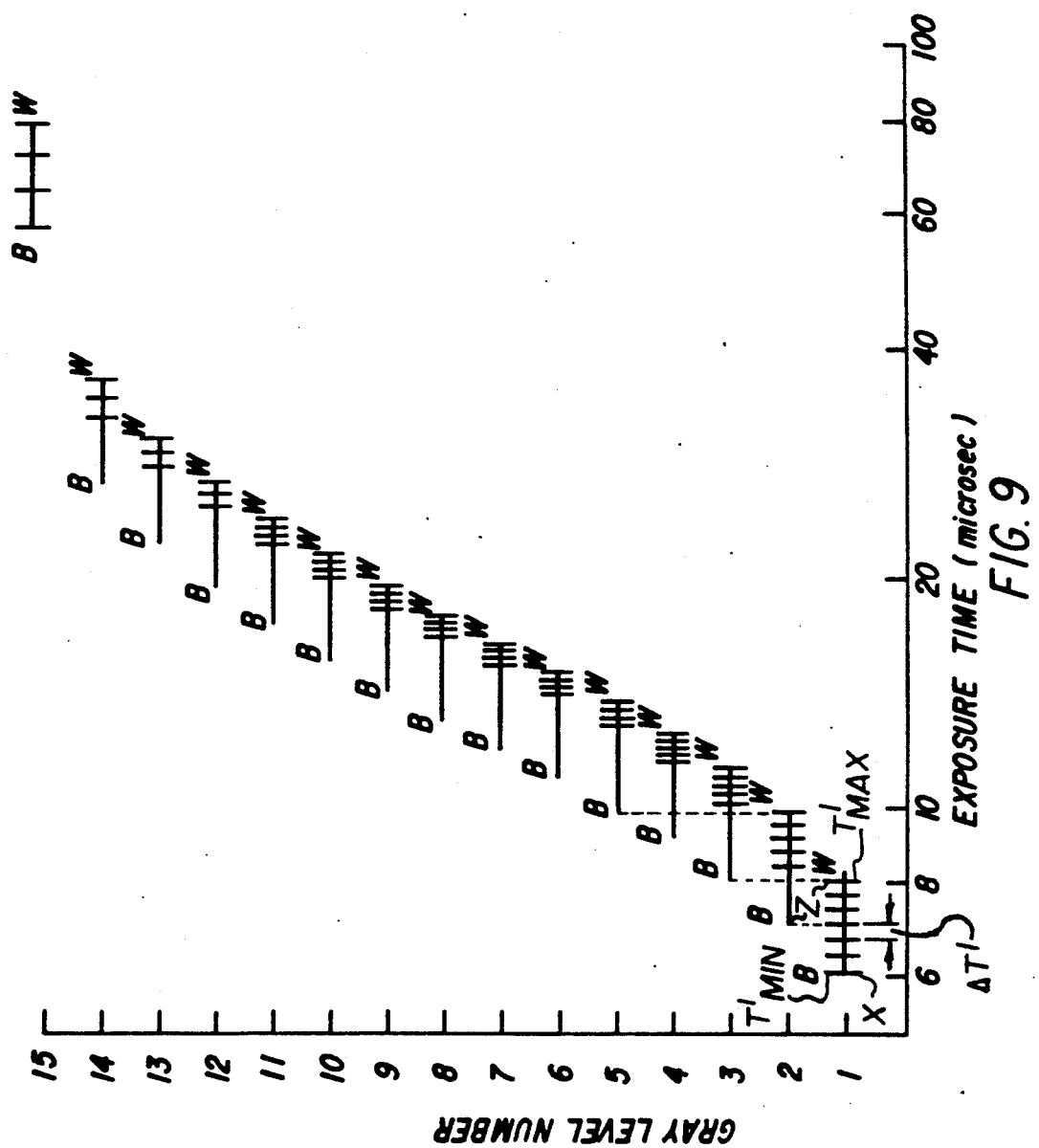

With reference now to the graph of FIG. 9, a modification from FIG. 7 has been made to eliminate overlap in exposure times between the various grey levels. In this example, the five approximating time values used for grey level No. 2, however, are confined to the time line portion of this line that will not provide overlap with other times in other grey levels. Thus, except for grey level No. 1, in this example closer approximations are made for exposure correction for the various grey levels as will be described below and more efficient use of data realized.

As may be noted from FIG. 9, for this example, the allowed exposure times number 63 which is $2^6-1$. This can be seen by counting the vertical exposure time lines shown, i.e., add the seven lines for grey level No. 1, the five lines for grey level No. 2, the five lines for grey level No. 3, etc. Thus, only 6 data lines are required to go to the printhead to provide possible exposure enabling times for the LED's that extends over a relatively long duration yet provides for fine approximations for correction in those areas of lightness space where it is needed.

Description will now be provided as to a method and apparatus for generating the signals for creating these 63 exposure times which are nonlinearly related. In the graph shown in FIG. 9, exposure times are shown to vary, for the particular printhead illustrated, from 6 microseconds to about 80 microseconds. Recall also that the technique employed for creating a single pulse width exposure period is to provide a minimum on time $T_{MIN}$ for the shortest duration pulse used which can be considered the pulse for driving the very brightest LED for the minimum time necessary to record grey level No. 1. As noted in the graph of FIG. 8, an exposure in time units is equated with a value number which latter number may be used as the count from counter 30. For each grey value, there are calculated the corresponding value numbers (from 0 to 63) of the allowed exposure times shown in FIG. 9.

With reference now to FIG. 2, description will now be provided relative to the circuit 33 for generating clock pulses that change with a varying periodicity. A memory device such as a first-in, first-out memory 18 is loaded in this example with a 12-bit number that is provided, for example, by a serial signal from LCU 31. This 12-bit number is output in parallel from the FIFO 18 and input to a 12-bit counter 17 that includes a comparator means. At the beginning of a PEL period (picture element period) this counter is reset by a signal from LCU 31 and in response to a synchronizing signal from LCU 31 commences to count clock pulses from master clock 19. Upon reaching the 12-bit count provided at its input, the counter 17 emits a single pulse and resets itself to repeat this operation. Alternatively, the counter may be preset to the 12-bit count that is input thereto and count down to zero and emit a single pulse. As long as the 12-bit number at its input remains unchanged the counter 17 will emit a series of pulses equally spaced in time. The output of this counter 17 comprises the output of the elements defined as the variable clock 33. As may be noted in FIG. 3 in the time line labelled "variable clock" the output of this clock is shown to be groups of clock pulses wherein, for this example, in each group the respective pulses are uniformly spaced. Each of these groups can be though of as representing exposure times for a particular grey level. However, recall also that as described with regard to FIG. 9 there is overlap in exposure times between grey levels. As may be noted from FIG. 9, the exposure times for grey level No. 15 can be approximated by 4 exposures times indicated by the vertical lines. These 4 times are represented by the 4 uniformly spaced in-time clock pulses (rising edges of variable clock 33) in the group labeled (grey level) "#15 MAX-#15 MIN." The spacing between clock pulses is directly related to the 12-bit number or clock coefficient output from FIFO memory device 18. In this example, the FIFO memory has input therein, from LCU 31, 127 clock coefficients. As the clock pulses are to be created in groups of uniformly spaced pulses, some of the coefficients are the same so that after counting to the 12-bit number and emitting a single variable clock pulse the counter receives the next 12-bit number which may be the same as the previous 12-bit number.

Figure 3:
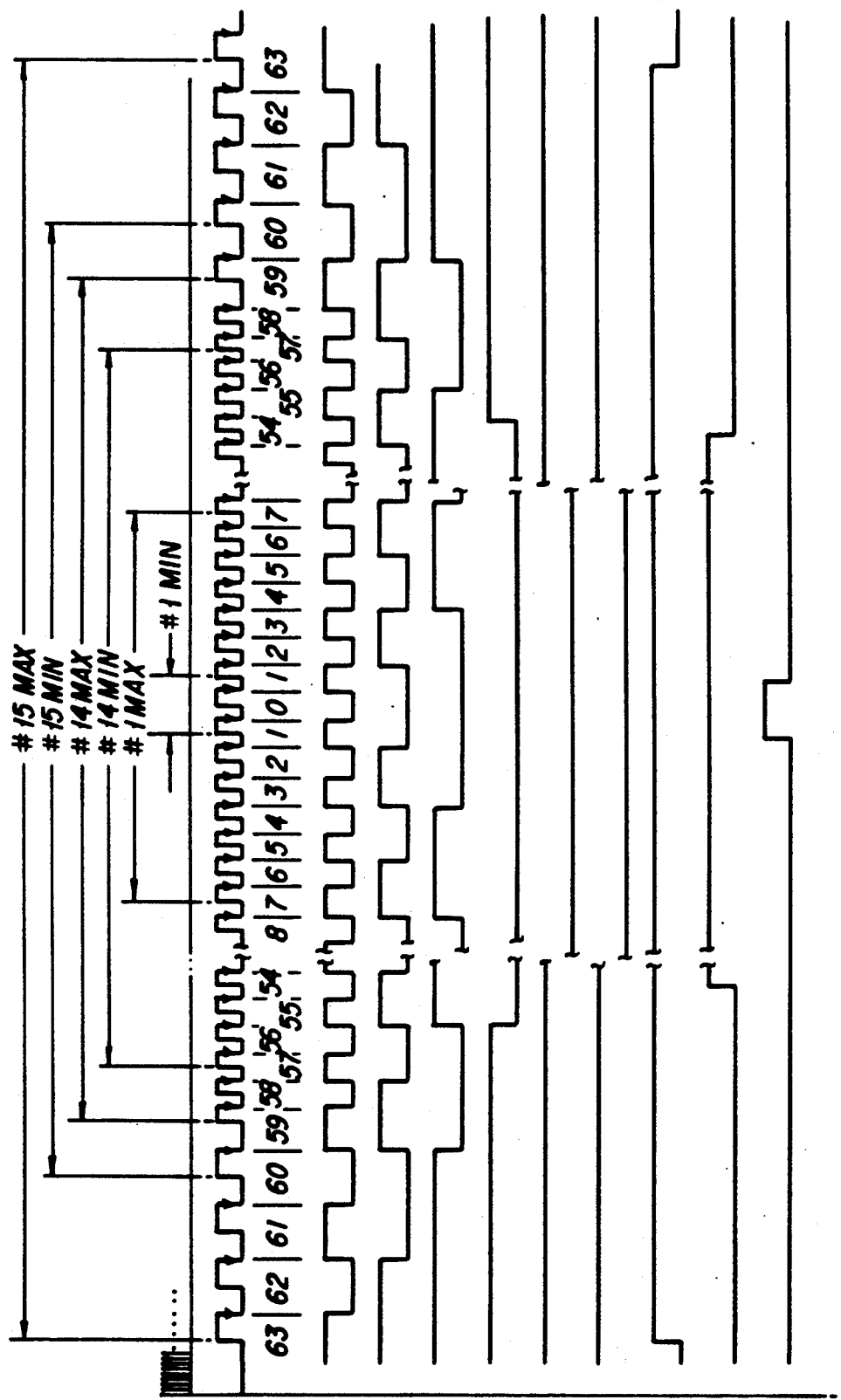
FIG. 3 is a timing diagram of sets of waveforms generated using the printer circuit of FIG. 2

After producing these 4 uniformly spaced clock pulses for grey level No. 15, the FIFO outputs a new 12-bit number. This causes 12-bit counter 17 to create a series of differently uniformly spaced pulses that are spaced a different amount in time related to the new 12-bit number output by the FIFO memory to the counter 17. The three pulses in this next group are labelled (grey level) "#14 MAX-#14 MIN" and relate to the three time divisions of grey level No. 14 shown in FIG. 9. The process continues in like manner to that described above with groups of uniformly spaced clock-like pulses created but having different periodicity from group to group. The up/down counter 30 counts these pulses and initially is in a down count mode. Thus, the output of the counter 30 has its six output lines $C_0-C_5$ provided with digital signals as shown in FIG. 3. The decimal representation of the combined count in all six lines $C_0-C_5$ is also indicated. As may be noted the count changes nonlinearly with time just in the same way for the time line illustrated in FIG. 9. Note in FIG. 3 that the longest duration pulse that can be provided is that shown as the pulse x used for the weakest (w) of the LEDs to energize each for a time period to record a grey level No. 15 dot. The shortest duration pulse Z is provided to the brightest of the LEDs (B) when energized to each record a grey level No. 1 dot. All other exposure times for the LEDs will be like pulse Y for a duration that is between these two extremes. Note all exposure pulses to create a dot are of a single pulse and are center pulse width modulated to provide for a better looking print particularly when printing lines, etc.

In the discussion provided above, it was noted that the data source 21 provided data information having 4 bits per pixel while the data passed along to data bus $D_0-D_5$ was 6 bits per pixel. As may be noted in FIG. 2, the data sources output is input to a lookup table memory device 16 along with an address provided by an address generator 25. The address generator points to the location in memory device 16 thereof where data is stored for each particular LED. Thus, a table of memory is provided for each LED and indicates for this LED A corresponding exposure time for each grey level it is to print. It is this exposure time which is a six-bit digital number that is output as data onto data bus $D_0-D_5$.

Figure 10:
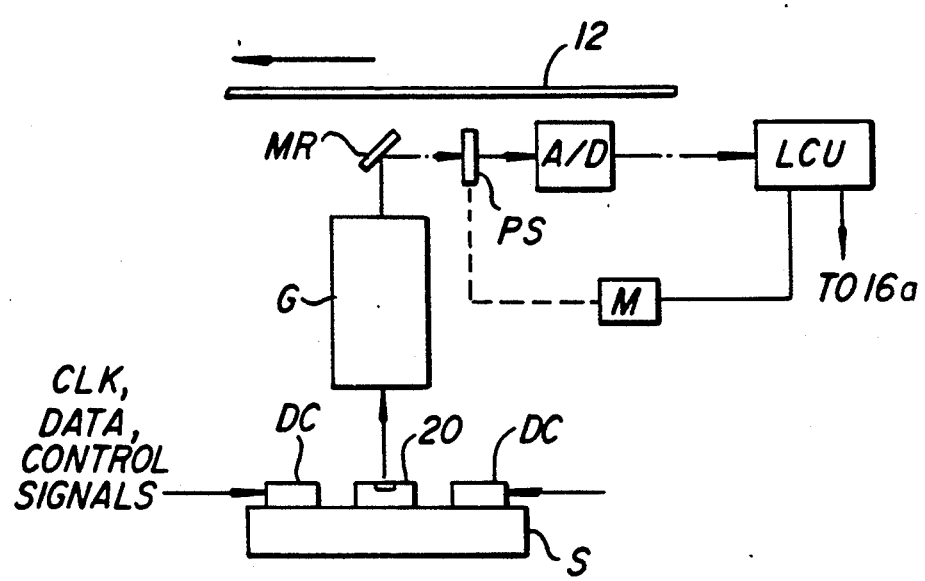
FIG. 10 is a schematic of portions of the apparatus illustrating an automated means for caluclating non-linear clock periods.
Figure 11A:
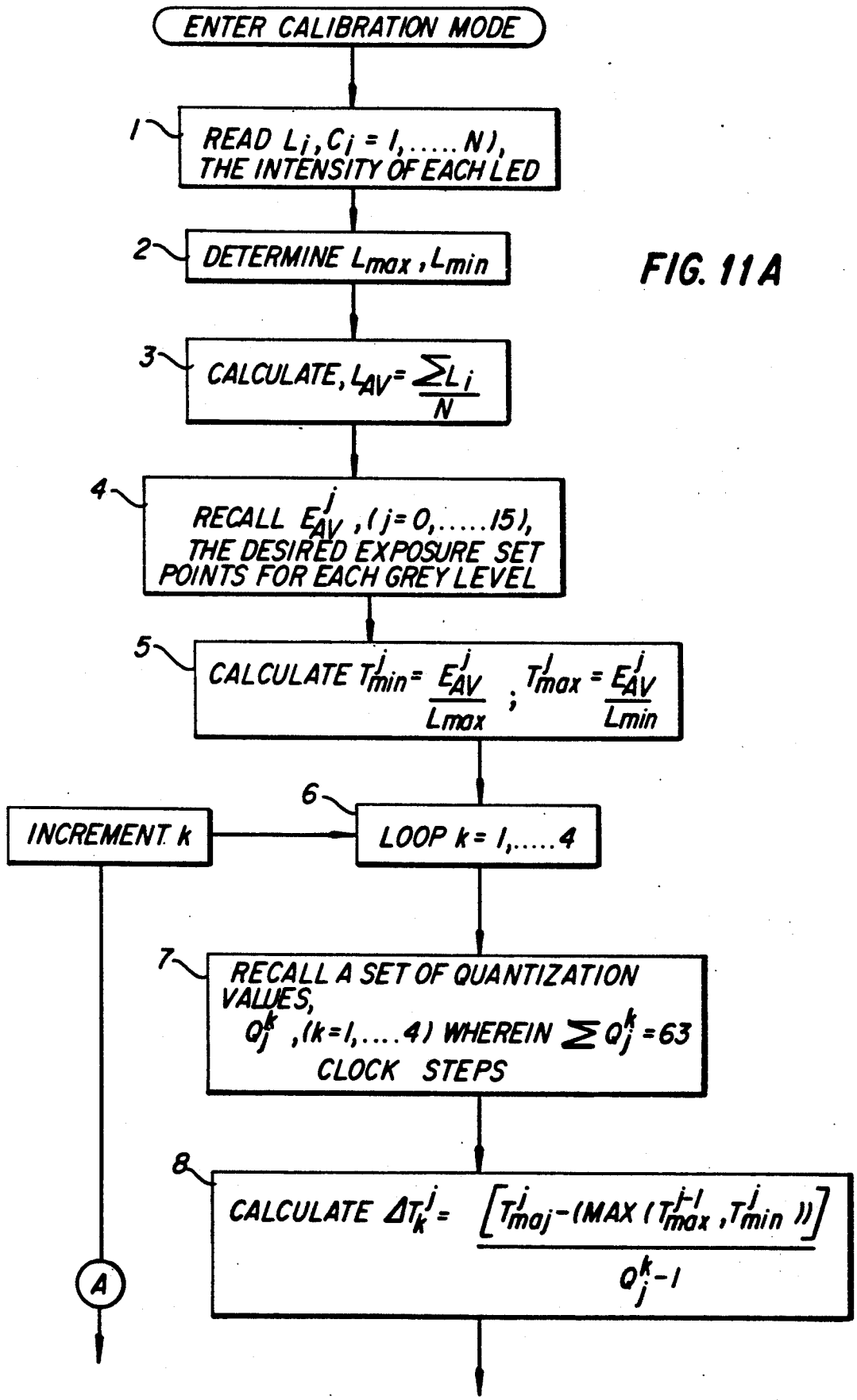
FIG. 11A and 11B together comprise a flowchart of a computer program for calculating exposure times used in a non-linear clocked printer.
Figure 11B:
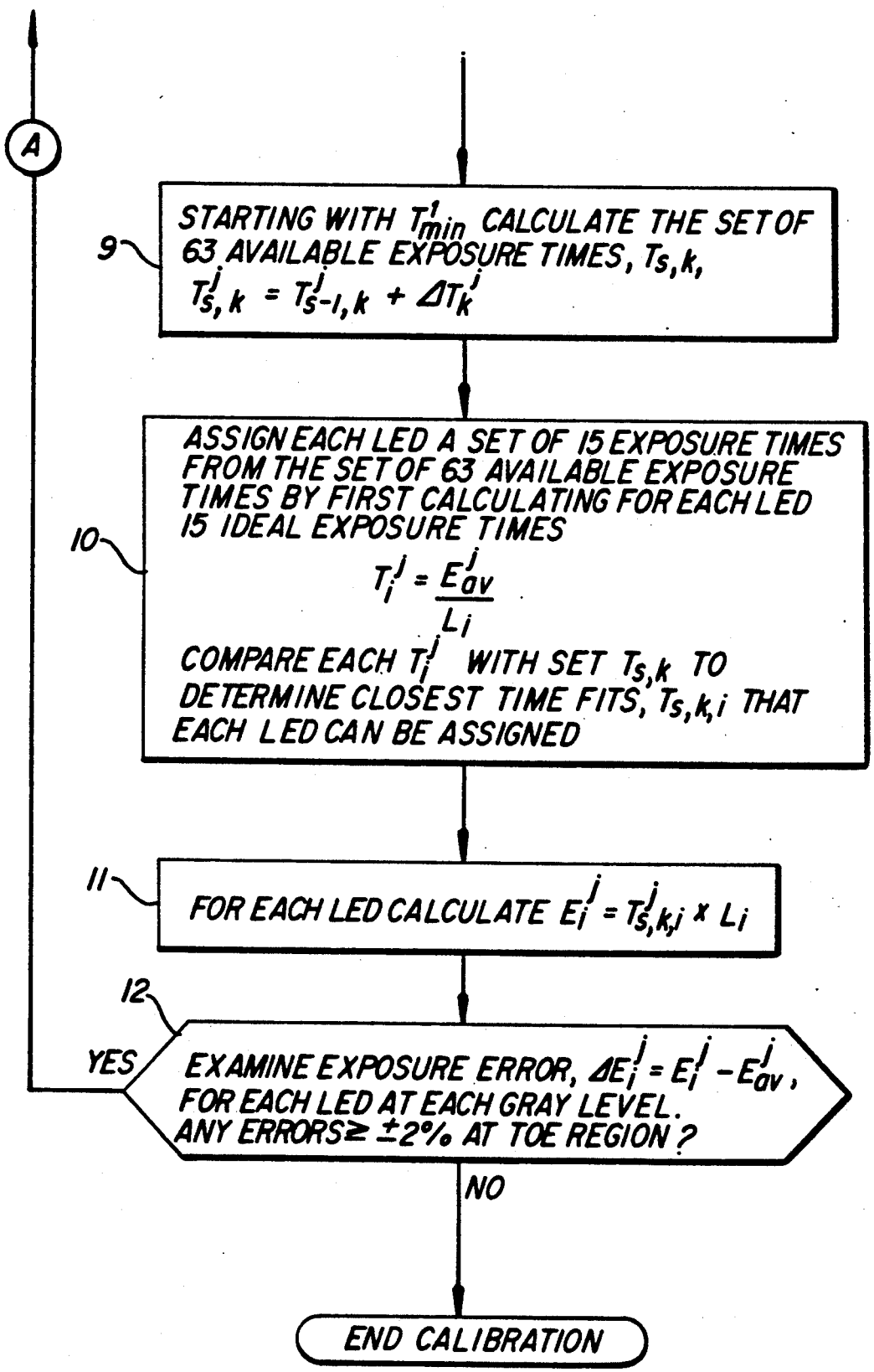

With reference now to FIGS. 10 and 11, the invention of automatically calculating the exposure times will now be discussed. As noted in FIG. 10, the LED's are mounted on a suitable support S as a row of aligned chip arrays 20. Integrated circuit driver chips DC receive appropriate signals for use in generating the exposure timing signals for controlling the on-time for each LED during exposure periods for recording lines of pixels. A Selfoc lens or gradient index lens, G, focuses light from the LED's onto photoconductive surface 12. In a calibration mode, a mirror, MR, is provided to reflect light from the output end of the lens, G, to a photosensor, PS, placed at the focal plane of the lens. Of course, calibration can take place without a mirror where the photoconductive surface 12 is removed and the photosensor is located at the focal plane of the lens. As noted also in FIG. 2, a motor is coupled to the mirror and photosensor to step same from LED to LED. The output of the photosensor is an analog signal and is input to an analog to digital converter (A/D) for input to the LCU over appropriate lines. The LCU controls the stepping of motor, M, photosensor PS, and mirror, MR, and includes a microcomputer programmed for calculating the 63 exposure times. The program for calculation of exposure times is in accordance with the flowchart of FIG. 11. In step 1, the LCU activates the stepper motor M to step the light measuring elements including photosensor PS so that the intensities, $L_i$, for each of the N=3584 LED's is determined. From these readings of intensity the LED with the maximum intensity, $L_{MAX}$, and that with the minimum intensity, $L_{MIN}$, are found (step 2). The average intensity $L_{AV}$ is then calculated (step 3). Programmed into the LCU are desired average exposure process set points, $E^j_{AV}$, for each of the 15 exposure levels, j=1, - - - 15. These set points have previously been determined, for example, experimentally based on the speed (exposure response) of the photoconductor. These set point values are recalled from the LCU's memory in step 4 and are used in step 5 to calculate the minimum and maximum exposure times $T^j_{MIN}$ and $T^j_{MAX}$ for each exposure period. As may be seen in FIGS. 8 and 9, the brightest LED (B) will be exposed for a period of $T^1_{MIN}$ for recording grey level #1 while the weakest LED (W) will be exposed for a longer period $T^1_{MAX}$ to achieve the same amount of exposure. In step 6, a program loop is established that will become evident from the discussion provided below. Initially, loop k=1 is established where in step 7, a set of quantization values are recalled from the LCU's memory. The quantization values, $Q^k_j$, comprise a set of numbers representing a likely breakdown of the number of exposures needed at each level to provide the desired uniformity. For example, in FIG. 9 the set of quantization values comprises the number 7 for grey level #1 (count the hash marks); 5 each for grey levels #2-4; and 4 for each of grey levels #'s 5-11, 15; and 3 for each of grey levels #'s 12-14). Note that the sum of the set of 55 numbers associated with each grey level is 63, the number of available exposure times. These quantization values are used to calculate the differences in time ΔT between adjacent exposure times at each grey level. This calculation is made in step 8 by taking the difference between the maximum exposure time at each exposure level, $T^j_{MAX}$ and subtracting from same "Start Value" defined as the greater or the maximum of the minimum exposure time, $T^j_{MIN}$ at that exposure level or the maximum exposure time $T^{j-1}_{MAX}$ at the previous level. This dividend is divided by a divisor $Q^k_j-1$, which say for grey level #1 might be $Q^k_1=7$ for the 7 time periods allocated to grey level #1.

Once the differential time period $\Delta T^j_k$, for each grey level is known, the 63 time periods can be calculated in step 9 starting with the shortest time period, $T^1_{MIN}$. This effectively locates the 63 hash marks in FIG. 9.

Now that the 63 exposure times are defined, there is a need to assign to each LED a subset of 15 exposure times from the set of 63 available exposure times. In step 10, these subsets of exposure times are determined by first calculating an ideal exposure time, $T^j_i$ for that LED by dividing the average set point exposure for that grey level, $E^j_{AV}$ by the previously measured intensity of that LED, $L_i$. This calculated time, $T^j_i$ is now compared with the set of 63 exposure values to determine which is closest to it. The closest value is assigned to that LED and noted as $T_{s,k,i}$. Thus, the brightest LED (B) in FIG. 9 might be assigned the time period defined by hash mark x for grey level #1, the time period defined by hash mark y for grey level #2 and the time period defined by hashmark z for grey level #3 and so on for each of the 15 levels of exposure and these would comprise the subset of exposure times $T_{s,k,i}$ to be assigned to this particular LED.

Now since an approximation has been made in assigning these closest exposure times, an error in exposure is expected. In step 11, the calculated exposures $E^j_i$ are found which are the products of the intensity of that LED, $L_i$, multiplied by the assigned time periods for each grey level. In step 12, the errors in exposure $\Delta E^j_i$ are calculated for each LED for each grey level. Also in step 12, percent exposure errors are examined to see if any are within a range greater than desired. For example, one criterion might be to have all exposure errors be less than 2%. Another criterion might be to have all exposures at the toe region (lower grey levels where the eye is most likely to notice such errors) be less than 2%. If the error criterion is met, the calibration period is over and the LED's are each assigned the 15 selected subset time periods from the set of 63 available time periods. If the criterion is not met, the program loops back to a new "k" loop where a different set of quantization values $Q^k_j$ are recalled from memory. For example, the new set might have the number 8 for grey level #1 and grey level #4 assigned the number 4 with the other values for the remaining grey levels not being changed. The sum for this new set would still remain 63. Steps 7-12 are repeated until the criterion of step 12 is met. Eventually, a suitable set of 63 available exposure times are found and each LED is assigned 15 exposure times from this set. These exposure times for each LED are stored in lookup table memory 16 (FIG. 2). When data from the data source 21 is sent to the look-up table memory 16, the LCU 31 has an address generator identify the address in the memory 16 for comparing the 4 bits/pixel data signal with the identity of the particular LED for which that data is intended. The 4 bits/pixel signal represents the grey level desired to be printed and this 4 bits signal is transformed to a 6 bits time-related signal representing the appropriate one of the 15 exposure times, $T_{s,j,k,i}$ assigned to that LED. Of course, the appropriate time is that time representing the desired grey level indicated by the 4 bits signal. The 6 bits time related signal is then communicated over bus line 22 to the appropriate driver for that LED as described above to control the on-time of that LED for recording a pixel.

Figure 12:
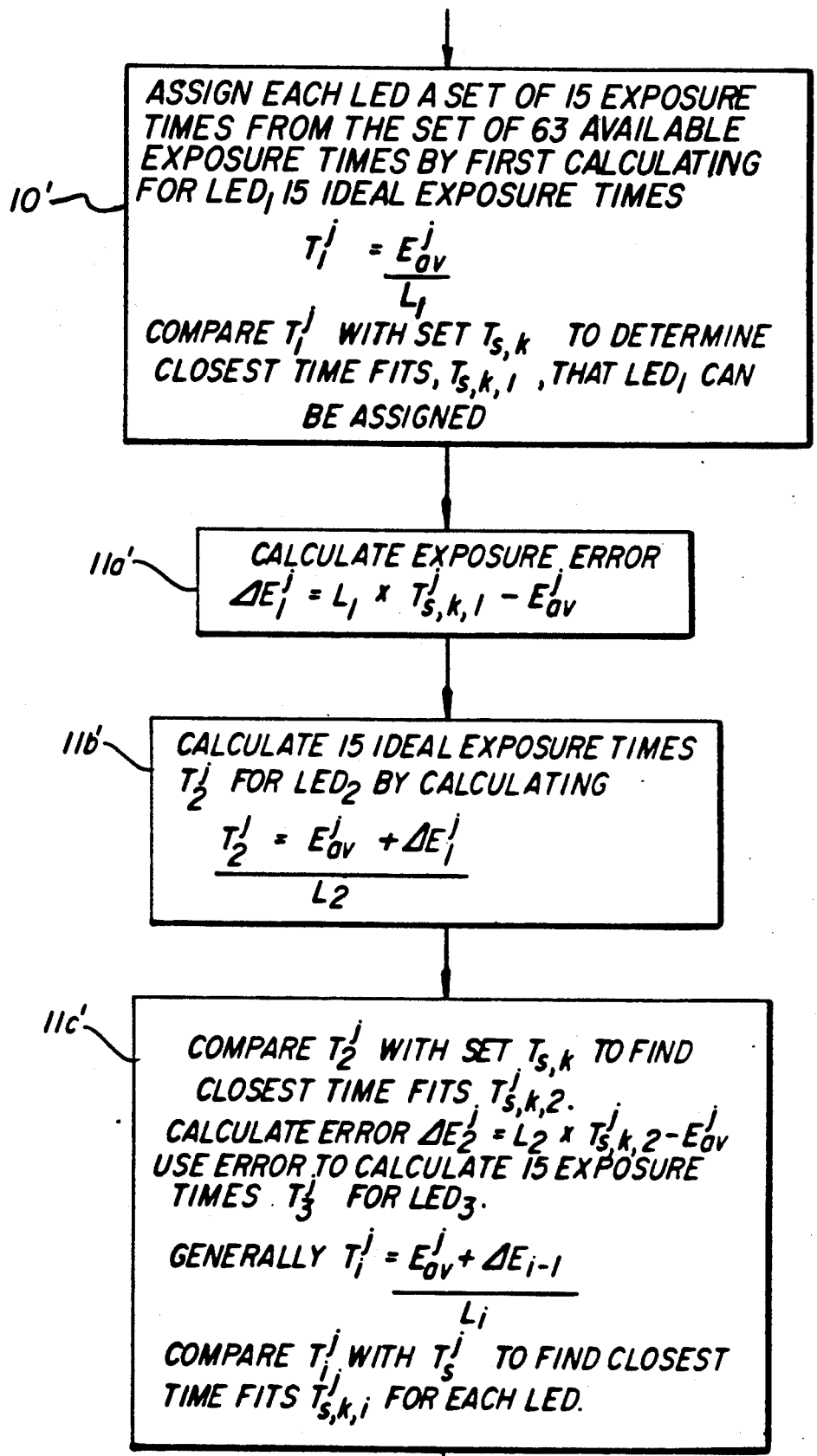
FIG. 12 is a flowchart illustrating a modification of certain steps in the flowchart of FIG. 11.

In FIG. 12, an improvement is described allowing for further accuracy in exposure and is based on the fact that adjacent LED's actually have their exposures partially overlap on the photoconductor. In the approach to be described, calculated errors in exposure for one LED are considered in calculating the exposure for the next adjacent LED. Thus, step 10 of FIG. 11 is replaced by step 10' of FIG. 12. In step 10' a set of 15 exposure times for the first LED on the printhead, $LED_1$, is determined from the set of 63 available exposure times determined in step 9 (FIG. 11). This is done first by calculating 15 ideal exposure times $T^j{}_1$ by dividing the desired average set point exposure for each grey level, $E^j{}_{av}$, by the measured intensity for $LED_1$. $T^j{}_1$ is then compared with the set of 63 exposures to determine the closest time fit $T_{s,k,1}$ that $LED_1$ can be assigned for each grey level. In step 11a' (which modifies step 11 of FIG. 11), the errors $\Delta E^j{}_1$ resulting by not using the ideal calculated time for each grey level exposure made by $LED_1$ are calculated by multiplying intensity, $L_1$, by the selected closest exposure time and subtracting from this product the ideal set point exposure for that grey level. When calculating the ideal exposure times for $LED_2$, the LED next to or adjacent $LED_1$, the error $\Delta E^j{}_1$ is used. As may be noted in step 11b', the 15 ideal exposure times $T^j{}_2$ for $LED_2$ are calculated using the sum of the respective ideal exposure set point for that grey level and the calculated error for that grey level found for $LED_1$. This sum is divided by the measured intensity $L_2$ for $LED_2$. These calculated ideal values are then compared with the set of 63 time values $T_{s,k}$ to select the subset of 15 exposure times that are closest. Once again, an error is created by assignment to a closest time and this error is used in calculating the 15 ideal exposure times, $T^j{}_3$ for $LED_3$. The process for determining the 15 assigned exposure time values for $LED_3$ is then made and the error in doing so is calculated. This process is repeated for all the LED's using the error from the preceding adjacent LED until all LED's have 15 assigned exposure times. In step 12 (FIG. 11), the exposure errors for each LED are compared with the criterion to determine if the assigned exposure times for each LED meet the required criterion. If they do, calibration is complete and these values are stored in the look-up table memory 16 and are used as described above. If they do not meet the criterion, the calculation process is repeated via step 7 (FIG. 11) using a new set of quantization values until the criterion is met.

The calibration process may take place in the factory where the printhead is manufactured and/or asembled in the machine. It may also take place from time to time where the printer is located during periods of job production inactivity. The use of an automatic calibrator as described herein on the printhead may obviate the need to correct data because of age and temperature considerations as indicated by device 16a. Such consideration may be corrected instead by adjusting current level to the LED's. However, they can be used to adjust data by employing certain adjustment factors described below.

While the six-bit per pixel signal $(D_0-D_5)$ represents exposure information corrected for nonuniformities of the LED's, it is recognized that during use of the printhead nonuniformities arise due to different aging of the LED's or due to differences in temperature. Aging differences are created when some LED's are used more than others during the course of different print jobs. In U.S. patent application Ser. No. 099,424, filed Sep. 21, 1987 and now U.S. Pat. No. 4,799,071, it is proposed to minimize aging differences by activating underused LED's during periods of non-use of the printer for printing a print job or otherwise correcting for non-uniformities based on differences in aging as the printhead is being used. Thus, factors such as those based on environmental considerations and/or usage may be accommodated by providing updated entries automatically from a correction calculator 16a to look-up table memory 16 during a production run when a calibration as defined above cannot be done.

The calibated printer has been described in terms of generating a set of center pulse width modulated waveforms for enabling the LED's, wherein in the count-up mode of counter 30 the clock pulses from programmable clock 33 are provided in reverse order from that provided during the count-down mode of counter 30. This is accomplished by loading the FIFO memory (other types of memory devices such as RAM, etc. may be substituted for the FIFO type memory) with the same 12 bit numbers but with the order of providing such numbers reversed from that during count-down. The printer need not be limited to providing center pulse width modulated waveforms. For example, all the LED's could become enabled at different times as described but stopped at the same time such as when the count reaches zero with no count-up mode being provided. Likewise, all the LED's may become enabled at the same time and terminated at different times during a count-up mode only. Still further, a count-down and count-up mode may be provided as described for the preferred embodiment but the clock pulses from the variable clock during count-up mode of counter 30 need not be provided to effectively mirror image those provided during the count-down mode of counter 30. Thus, instead of reversing during count-up of counter 30 the order of loading 12-bit numbers from FIFO 18 to 12-bit counter 17 different numbers or ordering may be used during count-up that results in the waveforms not being center pulse-width modulated.

While the master clock 19 has been described as producing clock pulses at regular intervals which are counted by the 12-bit counter, it is comtemplated that this master clock will also be programmable so that while still emitting regular clock pulses, the time period between such regular clock pulses may be adjusted. Such adjustability may be provided by coupling the master clock 19 to the LCU so that either inputs by an operator or through automatic operation, signals from the LCU to the master clock 19 can adjust the period between master clock pulses, as may be needed for color printing or other process control such as contrast.

Thus, in color printing, for example, using well known electrophotographic reproduction apparatus, successive separate image frames on a photoconductor are exposed with color separation images to be developed, respectively, with cyan, magenta and yellow toners. The developed image frames are then transferred in register to a copy sheet. In modulating the electrostatic charge on each image frame with the printing apparatus described herein to form the color separation images the variability of master clock 19 can prove useful. The clock pulse period from adjustable master clock 19 may be adjusted automatically for creating exposures on one color image frame, say cyan, to the next color image frame, say that for producing the magenta image. Adjustability of master clock 19 in combination with the variable programmable clock signals from programmable clock 33 provides for a very efficient and flexible control of exposure. In the example provided above for color reproduction, it is contemplated that the duration of each master clock pulse period used for printing one color separation image frame will differ by a few percent from that used in printing a different color separation image frame to provide the fine control for exposure time.

There has thus been described a method and apparatus for calibrating a non-impact dot printer wherein a programmable clock is employed for generating clock pulses with varying periodicity to create an exposure space that provides gradations of exposure more realistically directed to human visual perception and while doing so provides same with efficient use of data.

In the improvement described herein, an automatic means for calculating the exposure values for each of the grey levels for each of the LED's has been described that ensures that exposures will be within a desired criterion.

The invention has been described in detail with particular reference to preferred embodiments thereof, but it will be understood that variations and modifications can be effected within the spirit and scope of the invention.

What is claimed is:

1. A method for calibrating a printhead having a plurality of light-emitting recording elements, the method comprising the steps of:
   (a) measuring a light intensity of each recording element of said plurality of recording elements;
   (b) generating a first set of exposure times for which recording elements may be energized;
   (c) assigning for one recording element of said plurality of recording elements a first subset of said exposure times having a number of said exposure times less than in said first set and equal to a plural number of grey levels for recording by the one recording element;
   (d) for the one recording element, calculating an exposure error resulting from assigning for the one recording element the first subset of said exposure times from said first set;
   (e) comparing the exposure error with a criterion establishing acceptable error;
   (f) if the criterion is not met, generating a new set of said exposure times and then repeating steps (c)-(e) so that the criterion is met with a new subset of said exposure times from the new set of said exposure times;
   (g) when the criterion is met, storing the new subset of said exposure times in memory; and
   (h) in response to a signal calling for recording of a grey level pixel by said one recording element, the signal is transformed into a second signal for controlling a duration of a recording period for recording the pixel, the duration being related to one of the stored exposure times in said new subset.

2. The method of claim 1 and including the step of exposing a recording member for a period controlled by said second signal.

3. The method of claim 1 and wherein in step (a) the intensity of each recording element of said plurality of recording elements is measured automatically.

4. The method of claim 3 and including the step of exposing a recording member for a period controlled by said second signal.

5. The method of claim 1 and including the step of using the element in determining a second subset of said first set of exposure times for a second recording element of said plurality of recording elements, said second recording element being adjacent said one recording element.

6. The method of claim 5 and including the step of exposing a recording member for a period controlled by said second signal.

7. The method of claim 5 and wherein in step (a) the intensity of each recording element of said plurality of recording elements is measured automatically.

8. The method of claim 7 and including the step of exposing a recording member for a period controlled by said second signal.

9. The method of claim 1 and wherein for said one recording element, an ideal exposure time is calculated for one grey level of the plural number of grey levels by calculating a sum of an exposure set point for said one grey level and an error-related factor related to an exposure error calculated for a second recording element of said plurality of recording elements, said second recording element being adjacent said one recording element, and dividing the sum by a measured intensity of said one recording element.

10. The method of claim 9 and including the step of exposing a recording member for a period controlled by said second signal.

11. The method of claim 9 and wherein in step (a) the intensity of each recording element of said plurality of recording elements is measured automatically.

12. The method of claim 11 and including the step of exposing a recording member for a period controlled by said second signal.

13. A method for calibrating a printhead having a plurality of light-emitting recording elements, the method comprising the steps of:
   (a) measuring a light intensity of one recording element of said plurality of recording elements;
   (b) assigning for said one recording element a first subset of exposure times from a set of available exposure times, said first subset having a number of said exposure times equal to a number of grey levels for recording by said one recording element;
   (c) calculating exposure errors resulting from assigning for said one recording element the first subset of said exposure times from said set;
   (d) determining a second subset of said exposure times for a second recording element of said plurality of recording elements, said second recording element being adjacent said one recording element, said exposure times of said second subset being assigned from said set of available exposure times by using errors calculated in step (c) as a factor in determining the exposure times of the second subset;
   (e) storing signals related to the second subset of said exposure times in memory; and
   (f) exposing a recording member with light from said one recording element for an exposure time selected from said first subset of said exposure times and exposing the recording member with light from said second recording element for an exposure time selected from said second subset of said exposure times.

14. The method of claim 13 and wherein in step (a) the intensity of said one recording element is measured automatically.

15. The method of claim 13 and wherein the errors calculated in step (c) are used by calculating, for each of said grey levels, a sum of an exposure set point and an error-related factor related to one of said exposure errors calculated for said one recording element and dividing the sum by a measured intensity of said second recording element.

16. The method of claim 15 and wherein the intensity of said one and said second recording elements are each measured automatically; and a series of calculations employs the intensity measured for said second recording element to generate said signals related to the second subset of exposure times.

17. An apparatus for calibrating a printhead having a plurality of light-emitting recording elements, the apparatus comprising:
   first means for measuring a light intensity of each recording element of said plurality of recording elements;
   second means for generating a set of first signals corresponding to a first set of exposure times for which said recording elements may be energized;
   third means for generating for one recording element of said plurality of recording elements a second set of signals corresponding to an assigned first subset of said exposure times from said first set of said exposure times, said first subset having a number of said exposure times equal to a number of grey levels for recording by said one recording element;
   fourth means for calculating for said one recording element an exposure error resulting from assigning said one recording element one of said exposure times from said first set;
   fifth means for comparing signals representing the exposure error with signals representing a criterion establishing acceptable error and if the criterion is not met, generating a new set of first signals corresponding to a different set of said exposure times and a new set of second signals corresponding to a new subset of said exposure times from the different set of said exposure times and recalculating the exposure error until the criterion is met and when the criterion is met storing signals representing a subset of exposure times meeting the criterion in a memory; and
   sixth means, responsive to a multibit signal related to a grey level pixel for recording by said one recording element, for transforming the multibit signal into a signal for controlling a duration of a recording period for recording the pixel, the duration being related to one of the stored exposure times in said subset of exposure times meeting the criterion.

18. The apparatus of claim 17 and including seventh means for determining a second subset of said exposure times for a second recording element of said plurality of recording elements, said second element being adjacent said one recording element and said seventh means using errors calculated for the one recording element in determining said second subset of said exposure times.

19. An apparatus for calibrating a printhead having a plurality of light-emitting recording elements, the apparatus comprising:
   first means for measuring a light intensity of each recording element of said plurality of recording elements;
   second means for generating a first set of signals corresponding to a first subset of exposure times from a first set of available ones of said exposure times, said first subset having a number of said exposure times equal to a number of grey levels for recording by one recording element of said plurality of recording elements;
   third means for calculating exposure errors resulting from assigning said one recording element the first subset of said exposure times from said first set;
   fourth means for determining a second subset of said exposure times from said first set of said exposure times for a second recording element of said plurality of recording elements, said second recording element being adjacent said one recording element and said fourth means using the calculated errors as factors in determining the second subset of exposure times;
   memory means for storing signals related to the second subset of exposure times; and
   fifth means responsive to a multibit signal calling for recording of a grey level pixel by the second recording element for transforming the multibit signal into a signal for controlling a duration of a recording period for recording the pixel, the duration being related to one of the stored exposure times in said second subset.

20. The apparatus of claim 19 and including means for enabling said one recording element to record for a time period selected from said first subset of said exposure times and means for enabling said second recording element to record for a time period selected from said second subset of said exposure times.

21. The apparatus of claim 19 and wherein the fourth means determines the second subset of exposure times for the second recording element by calculating for each of said grey levels a sum of an exposure set point and an error-related factor related to an exposure error calculated for said one recording element and divides the sum by a measured intensity of said second recording element.

22. The apparatus of claim 21 and including means for enabling said one recording element to record for a time period selected from said first subset of said exposure times and means for enabling said second recording element to record for a time period selected from said second subset of said exposure times.

* * * * *